Patented Sept. 28, 1948

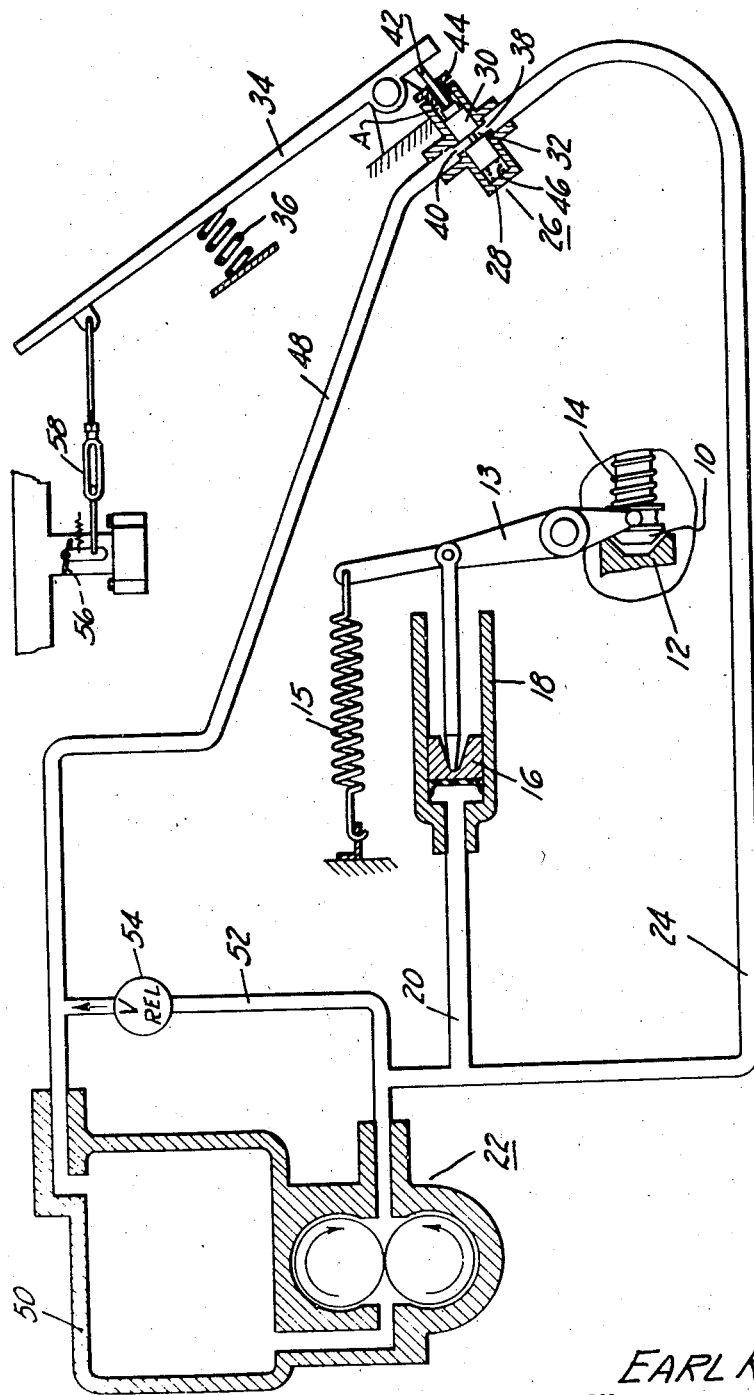

2,450,161

UNITED STATES PATENT OFFICE 2,450,161

CLUTCH CONTROL MECHANISM

Earl R. Price, South Bend, Ind., assignor to Bendix Aviation Corporation, South Bend, Ind., a corporation of Delaware Application May 28, 1945, Serial No. 596,312

4 Claims. (Cl. 192—.01)

This invention relates in general to a mechanism for operating a friction clutch and more particularly to power means for effecting the disengagement of and controlling the engagement of a standard spring operated friction clutch constituting a part of the power plant of the automotive vehicle.

The principal object of my invention is to provide an accelerator controlled power means, including hydraulic means, for effecting a disengagement of a friction clutch and for effecting a two stage engagement thereof.

Yet another object of my invention is to provide power means, including a continuously circulating closed hydraulic system, for operating a spring operated friction clutch the parts of said system being so constructed and arranged and controlled as to effect two stages of movement of the driven element of said clutch in the operation of moving said element into driving contact with the driving element of the clutch.

A further object of my invention is to provide, in the power plant of an automotive vehicle, a yieldable means for disengaging a conventional spring operated friction clutch and hydraulic power means, controlled by the accelerator of the vehicle, for overcoming said yieldable means and at the same time controlling the clutch engaging operation of the spring means of said clutch.

A further object of my invention is to provide hydraulic power means for controlling the engagement of a spring operated friction clutch of an automotive vehicle said means including a motor controlled by valve means, said valve means comprising a manually operated valve and the throttle valve of the engine of the vehicle, both of said valves being controlled by the operation of the accelerator of the vehicle.

One of the principal objects of the invention is to provide a two stage power means for controlling the clutch engaging operation of a conventional spring operated friction clutch said power means including a motor operably connected to the clutch, an engine driven hydraulic pump providing a source of power for energizing said motor and means for controlling the operation of said motor including an accelerator operated valve.

Yet another object of my invention is to provide a power clutch control mechanism operative, under all conditions of service, to operate the standard spring operated friction clutch of an automotive vehicle and therefore making it unnecessary to include in the power plant of the vehicle a conventional manually operated clutch pedal.

It is also within the purview of my invention to provide means, including hydraulically operated power means, for controlling the engagement of a friction clutch, the degree of clutch plate loading being directly proportional to the speed of the engine of the vehicle.

Other objects and advantages of the invention will be readily apparent to those skilled in the art from the following description taken in conjunction with the accompanying drawing which represents the preferred embodiment of my invention.

The sole figure of the drawing is a diagrammatic view disclosing the principal features of my invention.

Referring now to the drawing disclosing a preferred embodiment of my invention a conventional spring operated friction clutch, including the usual spring operated driven cone 10 and an engine driven driving plate 12, is operable by a lever 13. This lever 13 is biased to a position to disengage the clutch, that is compress a clutch spring 14 to separate the driving and driven plates of the clutch, by means of a spring 15. This spring 15 is connected to one end of the lever 13 and constitutes one of the principal elements of the clutch operating power means constituting my invention.

To the upper arm of the lever 13 there is connected the power element 16 of a pressure differential operated motor 18 and this motor constitutes the principle element of the hydraulic means of my invention said means serving to overcome, that is disable, the clutch disengaging spring 15 and to control the clutch engaging operation of the clutch spring 14.

Describing now the remainder of the hydraulic means of my invention to one end of the motor 18 there is connected a conduit 20 which is connected to the outlet, that is, high pressure side of a standard gear pump 22 said pump being driven by the internal combustion engine of the vehicle, not shown. A conduit 24 serves to interconnect the conduit 20 with an accelerator operated control valve 26. This valve includes a casing 28 which is bored to receive a spring pressed valve plunger member 30; and the latter member is provided with a recess 32 adapted, when the accelerator 34 of the car is released by a return spring 36, to position said valve member as disclosed in the drawing, that is register the recess 32 with ports 38 and 40 in the valve casing. As disclosed in the drawing a pin 42, secured to the upper end of the valve member 30, projects outside the valve casing and said pin is contacted by one end of the accelerator 34 when the latter is in its released position.

The pin 42 extends through a fitting 44 which is threadedly mounted within one end of the valve casing and as will be described hereinafter said fitting constitutes an adjustable stop for the valve plunger member 30; for by means of a spring 46 the latter member is biased upwardly and to the right in the drawing, to position said member against the fitting 44. When the driver removes his foot from the accelerator and releases all pressure thereon then the accelerator return spring 36, which is stronger than the spring 46, serves both to move the accelerator to the position disclosed in the drawing and to position the valve member 30 as disclosed in the drawing the recess 32 being then registered with the ports 38 and 40. In this position of the valve member 30 the spring 46 is compressed and a space, indicated by the letter A, is provided between the end of the fitting 44 and one end of said valve member. A conduit 48 interconnects an oil reservoir 50 with the valve port 40; and a bypass conduit 52 serves to interconnect the conduits 20 and 48. A pressure limiting or better termed safety valve 54 is preferably incorporated in the conduit 52.

Completing the description of the mechanism constituting my invention the throttle valve 56 of the internal combustion engine of the vehicle is connected to the accelerator 34 by force transmitting means including a lost motion connection 58 the parts of said connection being so constructed and arranged that upon depressing the accelerator the end of the accelerator moves away from the end of the pin 42 just prior to the opening of the throttle. As will be explained below this construction insures a completion of the first stage of clutch engaging operation just prior to an opening of the throttle which opening effects the second stage of clutch engaging operation of the mechanism of my invention.

Describing now the operation of the above described clutch control mechanism constituting my invention, when the accelerator is released the accelerator return spring 36 serves to rotate the accelerator to the position disclosed in the drawing; and by this operation the valve member 30 moves to the position disclosed in the drawing, the spring 46 being compressed. Assuming that the internal combustion engine is at the time idling then the engine driven gear pump 22 will force power fluid, that is the oil from the reservoir 50, into the conduit 20, through the recessed portion 32 of the valve member 30 and thence through the conduit 48 back to said reservoir. Now at this time the friction clutch is disengaged by the operation of the spring 15 inasmuch as the parts of the mechanism are so constructed and arranged and so operative that the pressure to which the power element 16 is then subjected is insufficient to overcome the clutch disengaging operation of said spring; and it is to be noted at this juncture that with the accelerator released the clutch is disengaged by the spring 15 irrespective of whether or not the engine is running. Now this is an important feature of my invention for it will be apparent that with the mechanism of said invention there is no need to provide a clutch pedal to disengage the clutch prior to cranking the engine; for with the well known manifold vacuum operated clutch control mechanisms of the day it is, of course, necessary to manually disengage the clutch prior to cranking the engine.

To effect the two stage clutch engaging operation of the mechanism of my invention the driver depresses the accelerator the first and relatively rapid stage of movement of the driven clutch element 10 being effected as the lost motion at 58 is being taken up and the second, relative slow stage of movement of said clutch plate being effected by an opening of the throttle. Describing this operation in detail when the accelerator is depressed the valve plunger member 30 is moved to the right by the spring 46 said movement being stopped when the space A is taken up, that is when said valve member contacts the adjustable stop 44. Now when the valve member 30 is in this position a small portion of the recess 32 registers with the ports 38 and 40 thus permitting the flow of a small quantity of oil from the conduit 24 into the conduit 48. This first stage operation, which is effected during the taking up of the lost motion at 58, results in a sufficient increase in pressure within the motor 18 to effect a clutch engaging movement of the lever 13; and this movement is at a relatively high rate of speed the spring 15 being elongated and a clutch spring 14 expanding to preferably move the clutch plate 10 up to but slightly short of engagement with the driving clutch plate 12: The system is then balanced the constant oil pressure developed by the then idling engine acting upon the piston 16 to maintain the spring 15 in a certain elongated state.

To effect the second and clutch contacting stage of operation of the mechanism, the accelerator is further depressed thereby opening the throttle to speed up the engine; and this operation results in a corresponding speeding up of the pump 22. It follows therefore that with the opening of the throttle the oil pressure acting on the power element 16 is increased to move the clutch plates 10 and 12 into contact with each other at a relatively slow rate, the degree of loading of said plates being directly proportional to the speed of the engine.

To prevent injury to the mechanism the pressure limiting or safety valve 54 is incorporated in the bypass conduit 52; and this valve is opened, to permit oil from the pump 22 to flow directly to the reservoir 50, after the clutch is fully engaged, that is after the clutch plate loading reaches a predetermined factor.

There is thus provided a simple yet efficient and effective two stage power means for operating a conventional spring operated friction clutch of an automotive vehicle. The mechanism is certain in operation and includes but three adjustable parts namely the lost motion connection 58, the stop 44 and the safety valve 54. A release of the accelerator serves to permit the spring 15 to quickly disengage the clutch and a depression of the accelerator serves to effect an operation of the hydraulic means, a closed continuously circulating system, to effect a two stage engagement of the clutch, the clutch plate loading being directly proportional to the speed, that is torque of the engine; and this is of course the desired operation. Incidentally the termination of the first stage of clutch engaging operation of the mechanism, which may be either prior to or just after the clutch plates have contacted, is controlled by an adjustment of the stop 44.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an automotive vehicle provided with an internal combustion engine having a throttle valve, an accelerator, force transmitting means interconnecting the accelerator and throttle valve, and a spring operated friction clutch; power means including yieldable means for disengaging said clutch and hydraulic means for controlling the engagement thereof in two stages of operation, said hydraulic means comprising a motor having its power element operably connected to the clutch, an engine driven pump constituting a source of power for energizing the motor, means for controlling the operation of said hydraulic means comprising an accelerator operated valve and fluid transmitting means interconnecting the motor, the valve and the pump, the parts of the aforementioned mechanism and the force transmitting means interconnecting the accelerator and engine throttle being so constructed and arranged and so operative that upon release of the accelerator the motor is deenergized thereby making possible a disengagement of the clutch by the yieldable means, the parts of the mechanism being also so constructed and arranged and so operative that upon initial depression of the accelerator the motor is energized to effect the first stage of movement of the driven clutch plate as the clutch is being engaged, the second stage of movement being effected when and only when the throttle is opened.

2. In an automotive vehicle provided with an internal combustion engine, an accelerator, and a spring operated friction clutch comprising a driving member, a driven member, and spring means biasing said members into engagement with each other; power means for disengaging the clutch and for effecting a two-stage engaging movement thereof, said power means including yieldable means for overcoming the aforementioned spring means to thereby effect a disengagement of the clutch and further including hydraulic means for overcoming said yieldable means to thereby control the engagement of the clutch in two stages of movement, the first stage being effected by the accelerator in engine idling position and the second stage by the accelerator in engine speed-up position, said hydraulic means comprising a hydraulic motor operably connected to the clutch, an engine driven pump, oil transmitting means, including an oil transmitting conduit directly interconnecting the outlet port of said pump and the motor, oil transmitting means interconnecting the aforementioned conduit and the inlet port of the pump and bypassing the motor, and accelerator controlled valvular means for controlling the operation of said motor, said valvular means being incorporated in the last mentioned oil transmitting means.

3. In an automotive vehicle provided with an internal combustion engine having a throttle valve, an accelerator, a friction clutch and an engine operated hydraulic pump; power means for operating the clutch comprising a hydraulic motor operable to control the engagement of the clutch, said motor having its power element operably connected to the clutch, a fluid transmitting conduit directly interconnecting the outlet port of said pump and the motor, other fluid transmitting means interconnecting the aforementioned fluid transmitting conduit and the inlet port of the pump and bypassing the motor, and accelerator operated control valve means incorporated in the second mentioned fluid transmitting means and operable to control the clutch engaging operation of said motor, said valve means including a movable valve member so constructed and so operative that when the accelerator is depressed to open the throttle valve there is provided a restricted opening through the valve for the passage of power fluid therethrough the restricted flow of power fluid through the valve cooperating with the operation of the pump to effect an energization of the motor to control the engagement of the clutch.

4. In an automotive vehicle provided with a friction clutch having driving and driven members and spring means operable to force said members into engagement with each other; spring means connected to the clutch and operable to effect a disengagement thereof, hydraulic means for controlling the clutch engaging operation of the latter spring means said hydraulic means including a motor operably connected to the spring means, a pump, fluid transmitting means interconnecting the motor, the inlet port of the pump and the outlet port of said pump, a power fluid within said motor, pump and fluid transmitting means, said fluid being continuously circulated from the outlet port to the inlet port of the pump so long as said pump is operating, and a motor controlling valve incorporated within a part of said fluid transmitting means, said valve being operative to control the rate of flow of power fluid from the outlet port to the inlet port and by so doing control the fluid pressure to which the power element of the motor is subjected.

EARL R. PRICE.

REFERENCES CITED

The following references are of record in the file of this patent:

UNITED STATES PATENTS

| Number | Name | Date |
|---|---|---|
| 1,923,819 | Gillett | Aug. 22, 1933 |
| 2,087,643 | Gillett | July 20, 1937 |